United States Patent
Ye et al.

(10) Patent No.: US 7,625,085 B2
(45) Date of Patent: Dec. 1, 2009

(54) TORIC CONTACT LENS WITH IMPROVED POSTERIOR SURFACE DESIGN

(75) Inventors: Ming Ye, Fort Worth, TX (US); Curtis Dean McKenney, Duluth, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 12/221,566

(22) Filed: Aug. 5, 2008

(65) Prior Publication Data
US 2009/0040458 A1  Feb. 12, 2009

Related U.S. Application Data

(60) Provisional application No. 60/954,339, filed on Aug. 7, 2007.

(51) Int. Cl.
G02C 7/02 (2006.01)
G02C 7/04 (2006.01)
(52) U.S. Cl. .................. 351/160 R; 351/159; 351/176
(58) Field of Classification Search ............ 351/160 H, 351/160 R, 159, 161, 163, 167–169, 174, 351/176–178; 623/6.23, 6.27
See application file for complete search history.

(56) References Cited

U.S. PATENT DOCUMENTS

| | | | |
|---|---|---|---|
| 4,418,991 A | 12/1983 | Breger | |
| 5,009,497 A * | 4/1991 | Cohen | 351/161 |
| 5,020,898 A | 6/1991 | Townsley | 351/160 R |
| 5,455,641 A | 10/1995 | Hahne et al. | |
| 5,650,838 A | 7/1997 | Roffman et al. | 351/177 |
| 5,767,939 A | 6/1998 | Komatsu et al. | 351/159 |
| 5,796,462 A | 8/1998 | Roffman et al. | |
| 5,861,114 A | 1/1999 | Roffman et al. | 264/2.5 |
| 6,000,798 A * | 12/1999 | Chipman et al. | 351/176 |
| 6,142,627 A * | 11/2000 | Winthrop | 351/169 |
| 6,176,577 B1 * | 1/2001 | Monnoyeur et al. | 351/159 |
| 6,241,355 B1 | 6/2001 | Barsky | 351/177 |
| 6,305,800 B1 * | 10/2001 | Miller et al. | 351/159 |
| 6,582,076 B1 * | 6/2003 | Roffman et al. | 351/161 |
| 6,843,563 B2 | 1/2005 | Richardson | 351/160 R |
| 6,923,540 B2 | 8/2005 | Ye et al. | 351/161 |
| 7,004,585 B2 * | 2/2006 | Lindacher | 351/161 |
| 7,036,931 B2 * | 5/2006 | Lindacher et al. | 351/161 |
| 7,192,138 B2 * | 3/2007 | Lindacher et al. | 351/168 |
| 2007/0046894 A1 | 3/2007 | Muckenhirn | |
| 2007/0146629 A1 | 6/2007 | Green | 351/160 R |

\* cited by examiner

*Primary Examiner*—Loha Ben
(74) *Attorney, Agent, or Firm*—Robert Ambrose

(57) ABSTRACT

Ophthalmic lenses for correcting astigmatism having a posterior surface with a central optic zone, a peripheral zone, and a blending zone therebetween. The surface of the central zone may be asphero-toric and the surface of the peripheral zone aspheric, with these flatter slopes smoothening out the transition between the central and peripheral zones. The blending zone gradually transitions the curvatures of the central and peripheral zones to further smoothen out the central-to-peripheral-zone transition.

24 Claims, 5 Drawing Sheets

TORIC CONTACT LENS WITH IMPROVED POSTERIOR SURFACE DESIGN

This application claims the benefit under 35 USC §119 (e) of U.S. provisional application No. 60/954,339 filed Aug. 7, 2007, incorporated by reference in its entirety.

TECHNICAL FIELD

The present invention relates generally to the field of ophthalmic lenses and, more particularly, to toric contact lenses for correcting for astigmatism.

BACKGROUND OF THE INVENTION

Many people have astigmatic aberrations in the corneas of their eyes. To help correct this optical error, toric contact lenses are commonly provided. Conventional toric lenses have a central optical zone and a peripheral zone. The surface of the central optical zone is toric (more accurately "sphero-toric"), that is, cylindrical along a first axis and spherical along a second normal axis, with each meridian of the surface described by a spherical equation and having a single radius, with the radius being different at different meridians. And the surface of the peripheral zone is spherical with a flatter slope than the central zone surface. These sphere-based surfaces are relatively easy and inexpensive to manufacture. To further facilitate high-volume manufacturing, the central toric surface is typically formed on the posterior surface of the lens.

Figure 1:
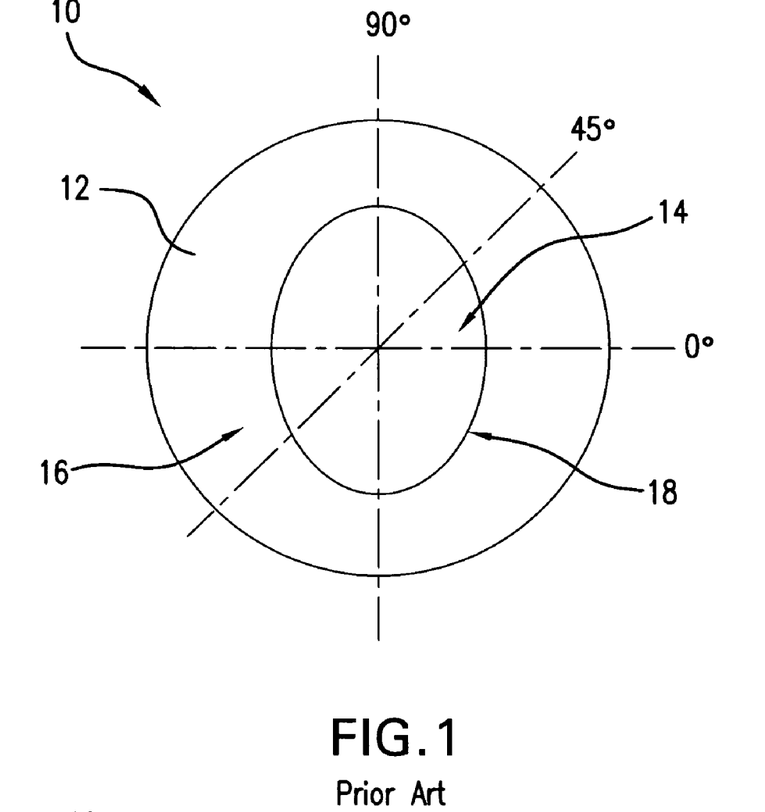
FIG. 1 is a plan view of a posterior surface of a conventional prior art toric lens having a spheric peripheral zone and a sphero-toric central zone that has a cylindrical axis along the R0 meridian, spherical axis along the R90 meridian, and a between cylindrical and spherical axis along the R45 meridian, with each meridian of the surface described by a spherical radius.
Figure 2:
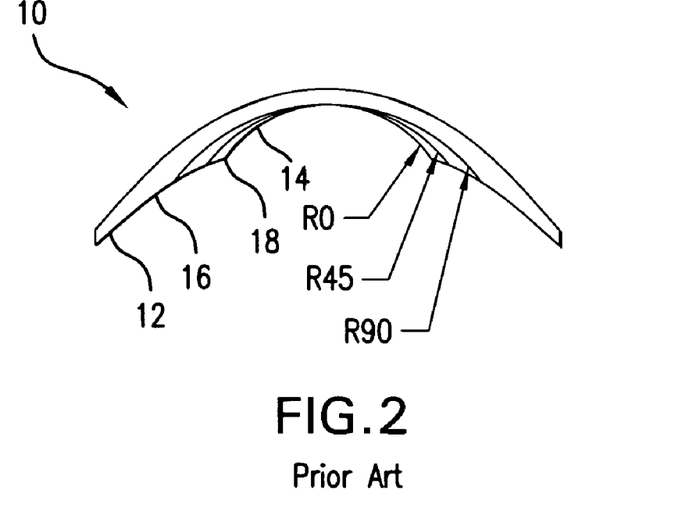
FIG. 2 is a cross-sectional view of the toric lens of FIG. 1, with the R0, R45, and R90 meridians superimposed to show the ridge formed at the junction of the peripheral and central zones.

FIGS. 1 and 2 show a conventional prior art toric contact lens 10 with a posterior surface 12 having a central sphero-toric optical zone 14 and a peripheral spherical zone 16. These two zones 14 and 16 meet at a junction 18 that forms an oval. At this junction, the slope of the posterior surface 12 changes. This can be seen in FIG. 2, which shows all three meridians R0, R45, and R90 superimposed together, with R0 being the cylinder meridian, R90 being the sphere meridian, and R45 being the meridian halfway therebetween, and with the slopes being exaggerated for illustration purposes. As shown in this figure, the slope change is the greatest along the R0 meridian and smallest along the R90 meridian. Along all meridians, the slope of the posterior surface 12 changes at the junction 18 from steep in the central zone 14 to flat in the peripheral zone 16. This steep-to-flat slope change results in a pronounced ridge at the junction 18 that bears against the cornea of the wearer. This ridge can apply pressure to the cornea, thereby causing irritation to the wearer. And for lenses made of relatively stiff materials such as silicon-hydrogel, this pressure can result in corneal epithelial staining.

Thus it can be seen that a need exists for improvements to toric lenses to provide an improved fitting relationship of the lens to the cornea for improved comfort and eye health, without sacrificing visual acuity. It is to the provision of such solutions that the present invention is primarily directed.

SUMMARY OF THE INVENTION

Generally described, in one aspect the present invention provides ophthalmic lenses for helping to correct astigmatism in the eyes of wearers. The lenses have a posterior surface with central optic zone, a peripheral zone, and a blending zone therebetween. The surface of the central zone may be asphero-toric so that it has a flatter slope farther away from the optic axis. And the surface of the peripheral zone may be aspheric so that it has a flatter slope farther away from the optic axis. These flatter slopes smoothen out the transition between the zones and provide for a better fit to the eye.

In addition, the blending zone gradually transitions the curvatures of the central and peripheral zones to further smoothen out the central-to-peripheral-zone transition. In the example embodiments described herein, the surfaces of the central and peripheral zones are selected so that the continuation of the curve of the central zone along the meridian halfway between the cylindrical and spherical axes is generally matched to the continuation of the curve of the peripheral zone. This results in the slope changes along the cylindrical and spherical axes being opposite and about the same in magnitude. In alternative embodiments included within the scope of the invention, the surfaces of the central and peripheral zones are selected for generally matching up the curves of the zones along other meridians.

In a first example embodiment of the invention, the central zone is asphero-toric and circular, the blending zone is a circular band with a constant width, and the peripheral zone is aspheric and a circular band with a constant width. With the zones all being circular, the lenses are easier to model and manufacture, and comfortable on the eye.

In a second example embodiment, the central zone is asphero-toric and oval, the blending zone is an oval band with a constant width, and the peripheral zone is aspheric. The oval shape of the central zone is the same as is provided in conventional toric lenses.

In a third example embodiment, the central zone is asphero-toric and circular, the blending zone is a circular band with a varied width, and the peripheral zone is aspheric. The blending zone is widest where the slope change is greatest (e.g., at the acylindrical R0 meridian and the aspherical R90 meridian), and is narrowest where the slope change is smallest (e.g., halfway between them at the R45 meridian).

In another aspect of the invention, there is provided a method of designing lenses for correcting astigmatism. The method can be used to design the lenses described herein and other embodiments of the invention. The design method includes the steps of defining a central zone of the lens surface, defining a peripheral zone of the lens surface, and defining a blending zone of the lens surface. The steps of defining the central and peripheral zones may include defining an asphero-toric surface and an aspheric surface. The step of defining the blending zone is done by blending the curves of the central and peripheral zones using for example a commercially available CAD software package with a spline function. This may be done by generally matching the continuations of the curves of the central and peripheral zones along one meridian (e.g., the R45 meridian), and then blending the curves along the other meridians. The resulting lens has a smooth transition between the central and peripheral zones to significantly reduce pressure on the eye.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions and/or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, there are shown lenses of example embodiments according to the present invention. The lenses of the present invention have an improved posterior surface design that significantly improves the fitting relationship of the lens to the cornea. In the example embodiments described herein the lenses are contact lens, however, the posterior surface design can be implemented in other ophthalmic lenses. The lenses can be made of any material conventionally used for ophthalmic lenses, including relatively stiff materials such as silicon-hydrogel, and can be made by conventional manufacturing techniques, including by using a single-point diamond cutting system, a one side molded/one side diamond-cut system, and/or a double sided molded system.

Figure 3:
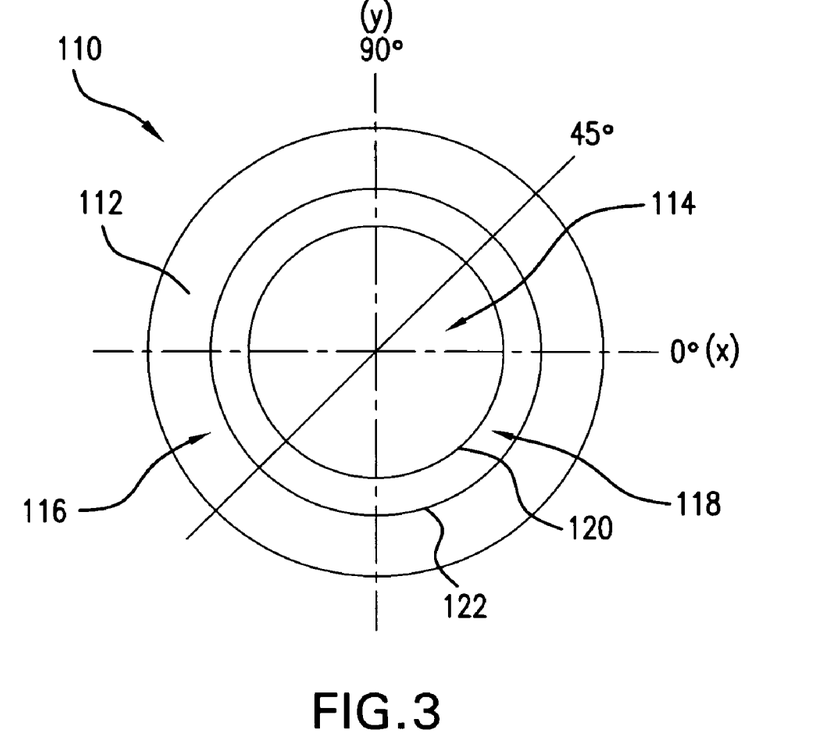
FIG. 3 is a plan view of a posterior surface of a toric lens according a first example embodiment of the present invention, showing a circular blending zone between aspheric peripheral and asphero-toric central zones.
Figure 4:
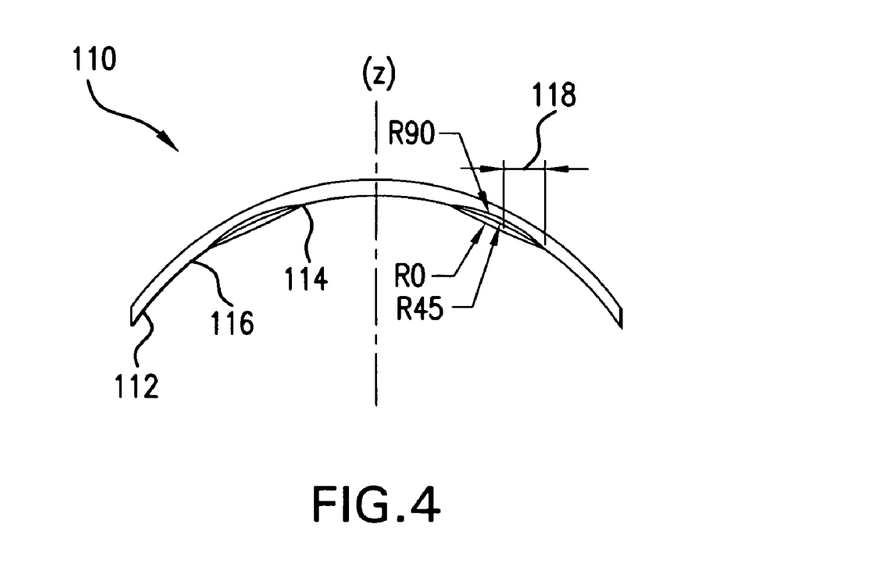
FIG. 4 is a cross-sectional view of the toric lens of FIG. 3, with the R0, R45, and R90 meridians superimposed to show the smooth blending zone between the peripheral and central zones.

FIGS. 3 and 4 show a toric contact lens 110 according to a first example embodiment. The lens 110 has a posterior surface 112 with a central optical zone 114 and a peripheral zone 116. The anterior surface may be provided with an optical correction selected for the particular eye that the lens 100 is to be worn on.

In order to provide a smoothened transition between the central zone 114 and the peripheral zone 116, and thereby help minimize or eliminate the protruding ridge at the junction of these zones, the peripheral zone 116 of the posterior surface 112 is aspheric and the central zone 114 is "aspherotoric" (or "atoric"). As used herein, "asphero-toric" and "atoric" mean having a cylindrical axis along a first meridian (e.g., the R0 meridian), a spherical axis along a second normal meridian (e.g., the R90 meridian), and a between cylindrical and spherical axis along a third meridian between the first and second meridians (e.g., the R45 meridian), with each meridian of the surface described by a conic aspherical equation and the conic constant being, for example, between −1.0 and 0.0. The "spherical" and "cylindrical" axes refer to the correction of the refractive error of the eye, not to the shape of the meridians. The spherical axis determines the spherical power and the cylindrical axis, which is normal to the spherical axis, determines the cylinder power. So in clinical practice, those skilled in the art typically refer to these axes as spherical and cylindrical, regardless of whether the shape of the curve at the meridians has a singe radius or is a conic section, i.e. is aspheric.

With respect to the peripheral zone 116, the aspheric surface is rotationally symmetrical about the optical axis and can be described, for example, by the equation:

$$z = \frac{(cx)(x^2)}{1 + \sqrt{1 - (1 + kx)(cx^2)(x^2)}}$$

where z and x are coordinates (z is the distance from the x-axis and x is the distance from the z-axis (the optical axis)), cx=1/apex radius x, and kx is the conic constant, where for example −2.0<kx<0.0. In other embodiments −1.0<kx<0.0, in yet other embodiments −0.7<kx<−0.1, and in still another embodiment kx=−0.16, such that the aspheric surface is an ellipsoid in these embodiments. However, other kx values may be used to define other aspheric surfaces of the peripheral zone 116 that may be of benefit in some cases. It will be understood by those skilled in the art that the "apex radius" of an aspherical surface is the radius at the apex of the surface.

With respect to the central zone 114, the asphero-toric surface can be described, for example, by the equation:

$$z = \frac{(cx)(x^2) + (cy)(y^2)}{1 + \sqrt{1 - (1 + kx)(cx^2)(x^2) - (1 + ky)(cy^2)(y^2)}}$$

where z, x, and y are coordinates (z is the distance from the x-axis and y-axis, x is the distance from the y-axis and z-axis, y is the distance from the x-axis and z-axis), cx=1/apex radius x, cy=1/apex radius y, and kx and ky are the conic constants relative to the x-axis and the y-axis, where for example −2.0<kx<0.0 and −2.0<ky<0.0. In other embodiments −1.0<kx<0.0 and −1.0<ky<0.0, in yet other embodiments −0.7<kx<−0.1 and −0.7<ky<−0.1, and in still other embodiments kx=ky=−0.16, such that the aspbero-toric surface is an ellipsoid in these embodiments. However, other kx and ky values may be used to define other asphero-toric surfaces of the central zone 114 that may be of benefit in some cases. In addition, the conic constants may be selected with −1<kx<0 and with ky not within this range, or vice versa.

In alternative embodiments, the central zone 114 has a conventional sphero-toric surface and the peripheral zone 116 has an aspheric surface as defined herein. And in other alternative embodiments, the central zone 114 has an asphero-toric surface as defined herein and the peripheral zone 116 has a conventional spheric surface. In such alternative embodiments, however, even along the R45 meridian there is a slope change between zones that results in a protrusion that can cause some wear on the cornea.

In order to further provide a smoothened transition between the central zone 114 and the peripheral zone 116, and thereby help minimize or eliminate the protruding ridge at the junction of these zones, the posterior surface 112 includes a blending zone 118 between the central and peripheral zones. The asphero-toric central zone 114 and the aspherhic peripheral zone 116 are preferably selected (by choice of the conic constant) so that, along a meridian between the cylindrical and spherical axes (e.g., the R45 meridian) in the blending zone 118, a continuation 124a of the curve of the central zone surface generally matches (is an exact continuation or a close approximation of) a continuation 124b of the curve of the peripheral zone surface (see FIG. 4A). Thus, there is no or only very little slope change between the central zone 114 and the peripheral zone 116, and thus no or only very little blending is done.

Figure 4A:
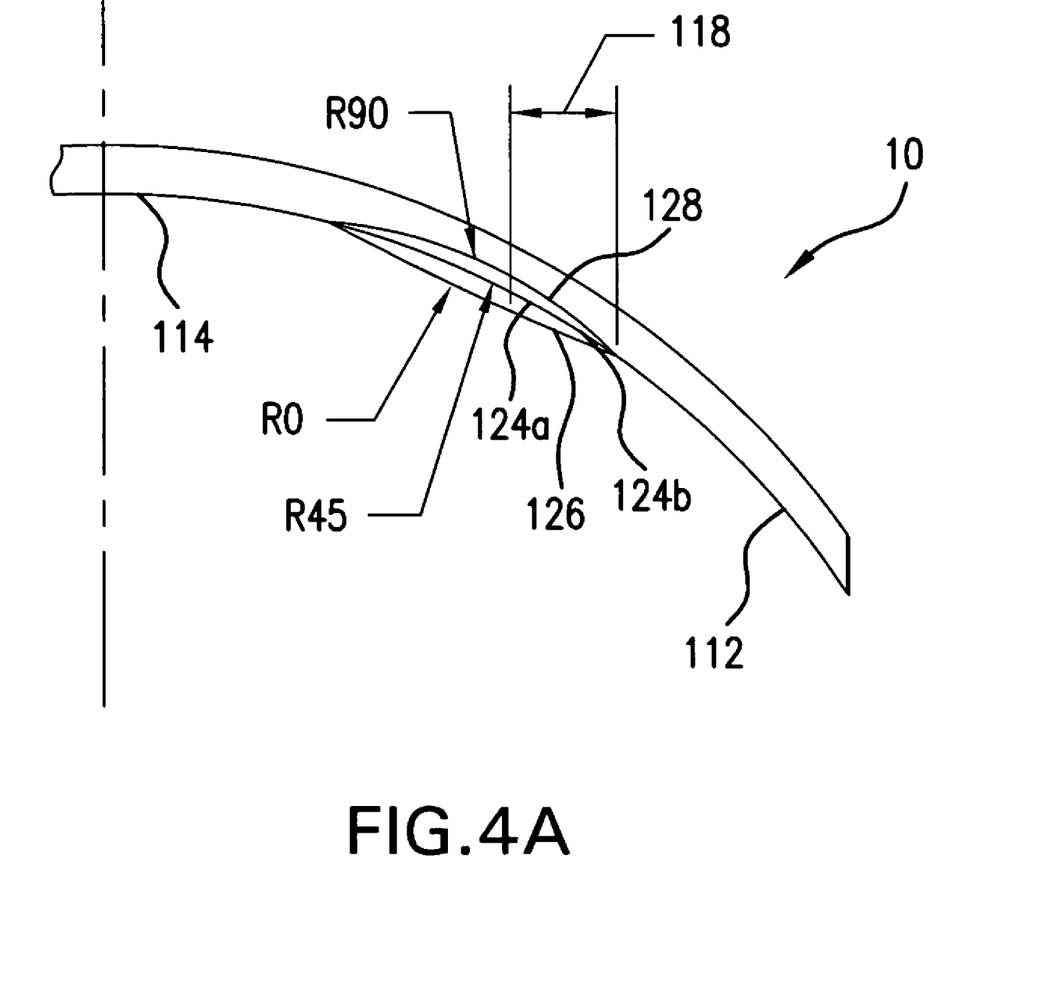
FIG. 4A is a detail of the toric lens of FIG. 4 showing details of the blending zone.

By generally matching up the curved surfaces of the central and peripheral zones 114 and 116 along the R45 meridian, the slope changes along the R0 and R90 meridians are opposite of each other and about the same in magnitude. So the amount of slope change to be blended is minimized and the width of the blending zone is minimized. Along the spherical axis (e.g., the R90 meridian), a spline curve 128 of the blending zone 118 gradually changes from flat to steep from the central zone 114 to the peripheral zone 116. So there is actually a recess formed in the surface 112 of the blending zone 118 resulting from the central-to-peripheral-zone transition, with the recess being slight and smooth, instead of the sharp protruding ridge of conventional toric lenses. And along the cylindrical axis (e.g., the R0 meridian), a spline curve 126 of the blending zone 118 gradually changes from steep to flat (and thus opposite the slope change along the R90 meridian) from the central zone 114 to the peripheral zone 116. So there is only a slight and smooth bulge resulting from the central-to-peripheral-zone transition, with the transition being much smoother than the sharp protruding ridge of conventional toric lenses.

In an alternative embodiment, the asphero-toric central zone and the aspherhic peripheral zone are configured so that, along the cylindrical axis (e.g., the R0 meridian) in the blending zone, a continuation of the curve of the central zone surface generally matches (is an exact continuation or a close approximation of) a continuation of the curve of the peripheral zone surface. Thus, along the R0 meridian (instead of along the R45 meridian) there is no or only very little slope change between the central zone and the peripheral zone, resulting in no or only a very slight bulge along that meridian. And along the R45 and R90 meridians, the slope changes from flat to steep from the central zone to the peripheral zone, thereby forming recesses in the posterior surface of the blending zone. Thus, in this embodiment, there is no or virtually no bulge or ridge to wear on the cornea of the wearer. However, in this embodiment the lens may need to be thicker to avoid an unacceptably weak spot at the R90 meridian, where the recess is deepest. And because there is a greater slope change to blend, the blending zone 118 may need to be wider.

In other alternative embodiments, other meridians between the R0 and R90 meridians are selected for generally matching up the curves of the central and peripheral zones. For example, generally matching up the curves of the central and peripheral zones along any meridian between the R35 and R55 meridians produces good results. In yet other alternative embodiments, none of the meridians are generally matched up, so there is a slope change blended along every meridian. However, in these embodiments, the greater slope changes may cause the need for a wider blending zone in which to blend the curves. And in still other alternative embodiments, the central zone is conventional toric surface, the peripheral zone is a conventional spheric surface, and the blending zone smoothly transitions the central and peripheral zones together.

In the lens 110 of this embodiment, the blending zone 118 is a circular band and may have a constant width of for example about 0.2 mm to about 1.0 mm. The central zone 114 is circular and, because it is the optical zone, it may have a diameter of for example no less than about 7 mm, which is about as large as a pupil of a typical adult human gets in low light. Thus, the inner boundary 120 of the blending zone 118 may have a diameter of for example no less than about 7 mm so that it does not interfere with the optics of the lens 110. And the outer boundary 122 of the blending zone 118 may have a diameter of for example about 8.2 mm to about 9.0 mm.

The peripheral zone 116 of the lens 110 is a circular band with a constant width (i.e., rotationally symmetric about the center line of the lens) so that it can be formed by rotating a basis curve mold without changing the thickness profile at the periphery of the lens. Another advantage of a circular band is ease-of-manufacturing. Moreover, a constant width and thickness peripheral zone 116 is generally preferred for a comfortable fit and for clinical performance. For these reasons, the lens 110 preferably includes the peripheral zone 116, instead of having the blending zone 116 extend outwardly all the way to the outer edge of the lens. The peripheral zone 116 may have constant width of for example about 1.0 mm to about 3.5 mm.

Figure 5:
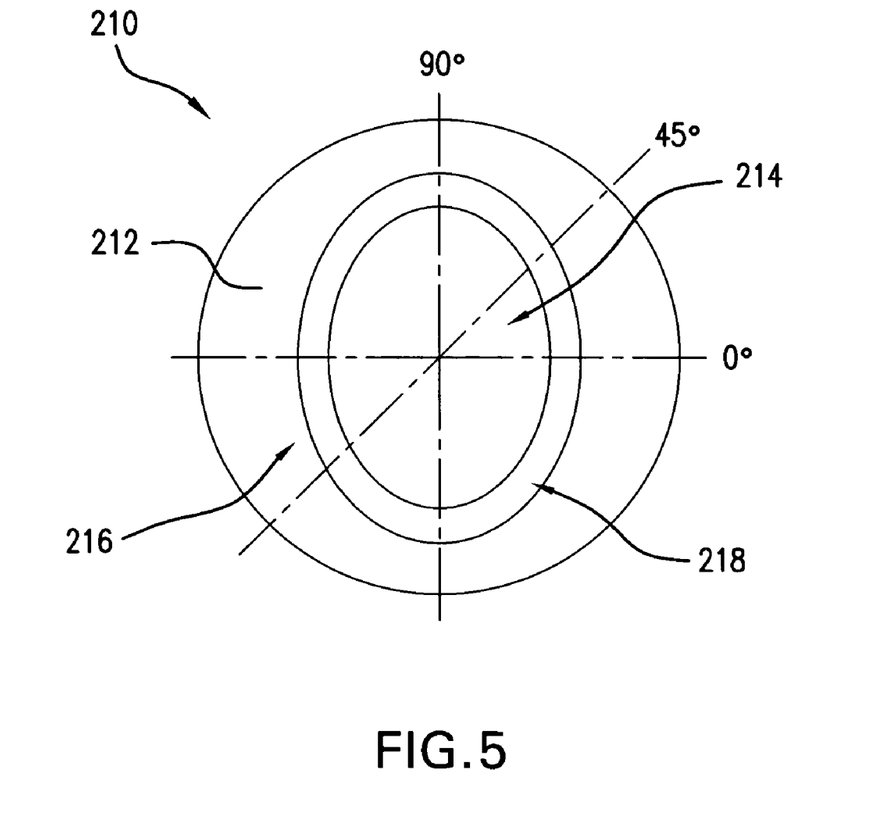
FIG. 5 is a plan view of a posterior surface of a toric lens according a second example embodiment, showing an oval blending zone between aspheric peripheral and asphero-toric central zones.
Figure 6:
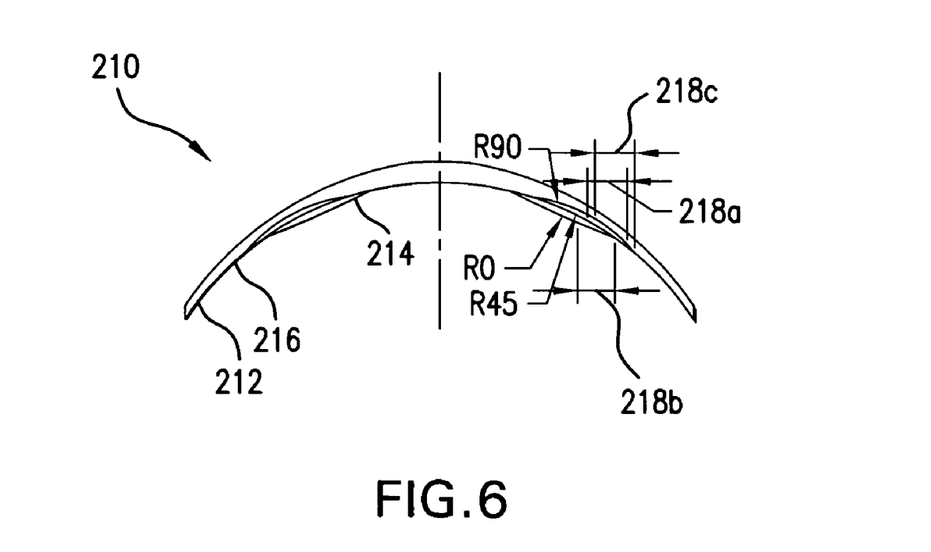
FIG. 6 is a cross-sectional view of the toric lens of FIG. 5, with the R0, R45, and R90 meridians superimposed to show the smooth blending zone between the peripheral and central zones.

FIGS. 5 and 6 show a toric contact lens 210 according to a second example embodiment. The lens 210 is similar to the lens 110 of the first embodiment, having a posterior surface 212 with a central asphero-toric optical zone 214, a peripheral aspheric zone 216, and a blending zone 218 therebetween. In this embodiment, however, the central zone 214 is an oval (as in conventional toric lens) and the blending zone 218 is an oval band. FIG. 6 shows the blending zone section 218a at the R45 meridian, the blending zone section 218b at the R0 meridian, and the blending zone section 218c at the R90 meridian. The diameter of the central zone 214 at the R0 meridian is usually determined by the cylinder power, i.e., a larger cylinder power will have a larger diameter. The minimum diameter of the central zone 214 may be for example about 7.0 mm at the R0 meridian and the maximum diameter may be for example about 12.5 mm at the R90 meridian. The blending zone 118 may have a constant width of for example about 0.2 mm to about 1.0 mm. And the peripheral zone 216 may have a minimum width of for example about 1.0 mm at the R90 meridian and a maximum width of for example about 3.5 mm at the R0 meridian.

Figure 7:
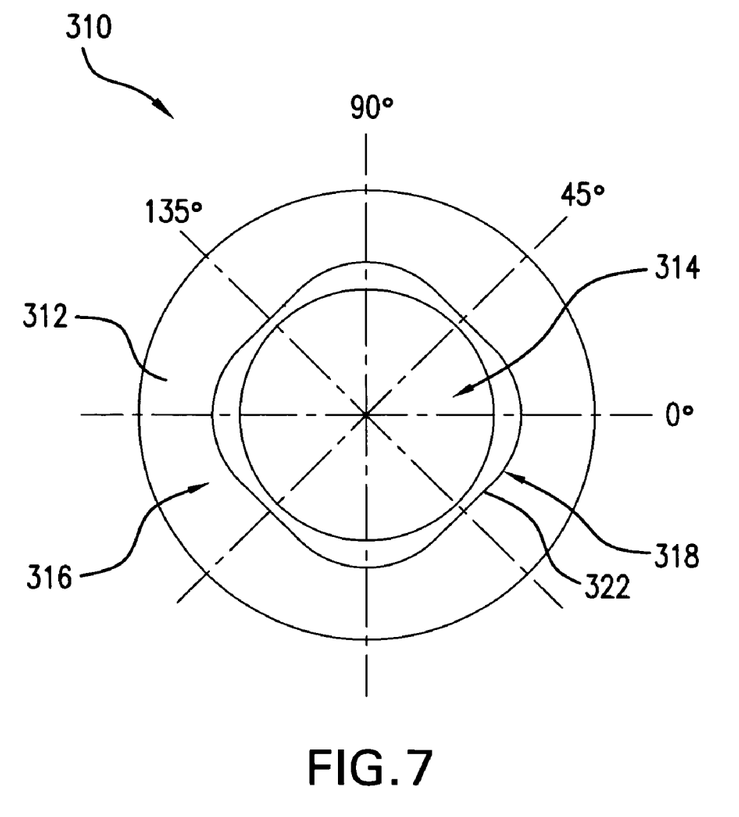
FIG. 7 is a plan view of a posterior surface of a toric lens according a third example embodiment, showing a varied-width blending zone between aspheric peripheral and asphero-toric central zones.
Figure 8:
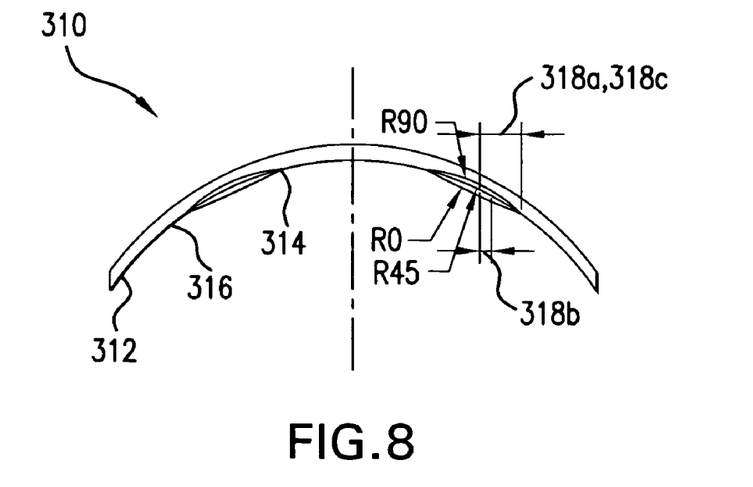
FIG. 8 is a cross-sectional view of the toric lens of FIG. 7, with the R0, R45, and R90 meridians superimposed to show the smooth blending zone between the peripheral and central zones.

FIGS. 7 and 8 show a toric contact lens 310 according to a third example embodiment. The lens 310 is similar to the lens 110 of the first embodiment, having a posterior surface 312 with a central asphero-toric optical zone 314, a peripheral aspheric zone 316, and a blending zone 318 therebetween. In this embodiment, however, the blending zone 318 has a varied width. The blending zone 318 is widest where the slope change is greatest (e.g., at the cylindrical R0 meridian and the spherical R90 meridian) to allow enough distance for a smooth transition between the curves being blended. And the blending zone 318 is narrowest where the slope change is smallest (e.g., halfway between the R0 and R90 meridians, at the R45 meridian) because a smooth transition can be made in a shorter distance. The blending zone 318 is provided with at least some width at the R45 meridian to facilitate the blending using conventional computer-aided design (CAD) software. The minimum width of the blending zone 318 may be for example about 0.02 mm at the R0 and R90 meridians and the maximum width may be for example about 1.0 mm at the R45 meridian. As mentioned herein, the central zone 314 may have a diameter of for example at least about 7.0 mm so as not to interfere with the optics of the lens. So the variance in the blending zone width is the result of variations in the outer boundary 322. This embodiment tends to provide more uniform transitions of the curves being blended, however, due to the variation in the width of the blending zone 318, modeling this lens tends to be more difficult. It will be understood that a varied-width blending zone also can be implemented in a lens with an oval central zone.

In another aspect of the invention, there is provided a method of designing the lens of the example embodiments and other embodiments of the invention. The method may be performed by using a commercially available CAD software package stored on a general-purpose personal computer such as a desktop, laptop or handheld computer. The CAD software package includes a feature for applying a spline function to generate spline curves to blend the curves of the central and peripheral zones. Commercially available programs that can be used in the method include those sold under the brand names "SOLIDWORKS" by SolidWorks Corporation (Concord, Mass.), "PRO/ENGINEER" by Parametric Technology Corporation (Needham, Mass.), and "AUTOCAD" by Autodesk, Inc. (San Rafael, Calif.).

The design method includes the steps of defining the central zone of the posterior surface, defining the peripheral zone of the posterior surface, and blending the curves of the central and peripheral zones in the blending zone using the spline function. The central zone may be defined by the asphero-toric surface described herein and have a plan-view shape and dimensions such as those described herein. The peripheral zone may be defined by the aspheric surface described herein and have a plan-view shape and dimensions such as those described herein. To blend the surfaces of the central and peripheral zones, the continuation of the curve of the central zone along one meridian is generally matched to the continuation of the curve of the peripheral zone. Then, using the spline function of the CAD program, the curves of the central and peripheral zones along each meridian are blended together. For example, by generally matching the curves along the R45 meridian, then the slope changes along the R0 and R90 meridians will be opposite of each other and have about the same magnitude. Alternatively, the method may include generally matching the curves along another meridian between the R0 and R90 meridians, for example, any meridian between the R35 ad R55 meridians. The resultant posterior surface of the lens has a smooth transition between the central and peripheral zones, with only a slight and smooth bulge at portions of the transition, thereby greatly reducing lens pressure on the eye of the wearer.

While the invention has been described with reference to preferred and example embodiments, it will be understood by those skilled in the art that a variety of modifications, additions and deletions are within the scope of the invention, as defined by the following claims.

What is claimed is:

1. An ophthalmic lens, comprising:
a posterior surface having a central optic zone, a peripheral zone, and a blending zone therebetween;
the central zone being asphero-toric and defined by the equation:

$$z = \frac{(cx)(x^2) + (cy)(y^2)}{1 + \sqrt{1 - (1 + kx)(cx^2)(x^2) - (1 + ky)(cy^2)(y^2)}}$$

where z, x, and y are coordinates relative to respective z-, x-, and y-axes, cx=1/apex radius x, cy=1/apex radius y, and kx and ky are conic constants relative to the respective x- and y-axes, where $-2.0 < kx < 0.0$ and $-2.0 < ky < 0.0$;
the peripheral zone being aspheric, rotationally symmetrical about the z-axis, and defined by the equation:

$$z = \frac{(cx)(x^2)}{1 + \sqrt{1 - (1 + kx)(cx^2)(x^2)}}$$

where z and x are coordinates relative to the respective z- and x-axes, cx=1/apex radius x, and kx is the conic constant, where $-2.0 < kx < 0.0$; and
the blending zone forming a smoothened transition between the asphero-toric central zone and the aspheric peripheral zone, the blending zone described at least in part by spline curves, wherein along a cylindrical meridian and a spherical meridian the slope changes of the spline curves in the blending zone are opposite and about the same in magnitude, and along a meridian halfway between the cylindrical and spherical meridians in the blending zone a continuation of the central zone generally matches a continuation of the peripheral zone.

2. The lens of claim 1, wherein, for the central zone, $-1.0 < kx < 0.0$ and $-1.0 < ky < 0.0$, and for the peripheral zone, $-1.0 < kx < 0.0$, or wherein, for the central zone, $-0.7 < kx < -0.1$ and $-0.7 < ky < -0.1$, and for the peripheral zone, $-0.7 < kx < -0.1$.

3. The lens of claim 1, wherein, for the central zone, kx=ky=$-0.16$, and wherein, for the peripheral zone, kx=$-0.16$.

4. The lens of claim 1, wherein the blending zone is a circular band having an inner diameter of no less than about 7.0 mm and an outer diameter of between about 7.2 mm and about 9.0 mm.

5. A method of designing the lens of claim 1, comprising:
defining the asphero-toric central zone of the posterior surface;
defining the aspheric peripheral zone of the posterior lens surface; and
defining the blending zone of the lens surface by generating the spline curves to smoothen the transition between the asphero-toric central zone and the aspheric peripheral zone.

6. An ophthalmic lens, comprising:
a posterior surface having a central optic zone, a peripheral zone, and a blending zone therebetween;
the central zone configured for correcting astigmatism; and the blending zone forming a smoothened transition between the central zone and the peripheral zone, the blending zone described at least in part by spline curves.

7. The lens of claim 6, wherein the central zone is asphero-toric and the peripheral zone is spheric, the central zone is sphero-toric and the peripheral zone is aspheric, or the central zone is asphero-toric and the peripheral zone is aspheric.

8. The lens of claim 6, wherein, along a first cylindrical meridian and a second spherical meridian, the slope changes of the spline curves in the blending zone are opposite, and along a third meridian somewhere between the first and second meridians in the blending zone, a continuation of the central zone generally matches a continuation of the peripheral zone.

9. The lens of claim 8, wherein the third meridian is halfway between the first and second meridians, and along the first and second meridians, the slope changes of the spline curves in the blending zone have about the same magnitude.

10. The lens of claim 6, wherein the central zone is circular and the blending zone is a circular band.

11. The lens of claim 10, wherein the blending zone has an inner diameter of no less than about 7.0 mm and an outer diameter of between about 7.2 mm and about 9.0 mm.

12. The lens of claim 6, wherein the central zone is oval-shaped and the blending zone is an oval band.

13. The lens of claim 12, wherein the blending zone has an inner diameter of no less than about 7.0 mm along a cylindrical meridian of the lens and no more than about 12.5 mm along a spherical meridian of the lens.

14. The lens of claim 6, wherein the blending zone is a varied-width band having a maximum width along a meridian having a greatest slope change between the central and peripheral zones and having a minimum width along a meridian having a smallest slope change between the central and peripheral zones.

15. The lens of claim 14, wherein the minimum width of the blending zone is about 0.2 mm and the maximum width is about 1.0 mm.

16. A method of designing the lens of claim 6, comprising:
defining the central zone and the peripheral zone of the posterior lens surface; and
defining the blending zone of the lens surface by generating the spline curves to smoothen the transition between the central zone and the peripheral zone.

17. The method of claim 16, wherein:
the step of defining the central and peripheral zones comprises defining the central zone as asphero-toric and the peripheral zone as spheric, the central zone as sphero-toric and the peripheral zone as aspheric, or the central zone as asphero-toric and the peripheral zone as aspheric; and
the step of defining the blending zone comprises selecting a conic constant for the central zone, the peripheral zone, or the central and peripheral zones so that, along a first cylindrical meridian and a second spherical meridian, the slope changes of the spline curves in the blending zone are opposite of each other, and along a third meridian somewhere between the first and second meridians in the blending zone, a continuation of the central zone generally matches a continuation of the peripheral zone.

18. An ophthalmic lens, comprising:
a posterior surface having a central optic zone and a peripheral zone, the central zone being asphero-toric and configured for correcting astigmatism, and the peripheral zone being aspheric.

19. The lens of claim 18, wherein:
the central asphero-toric zone is defined by the equation:

$$z = \frac{(cx)(x^2) + (cy)(y^2)}{1 + \sqrt{1 - (1+kx)(cx^2)(x^2) - (1+ky)(cy^2)(y^2)}}$$

where z, x, and y are coordinates relative to respective z-, x-, and y-axes, cx=1/apex radius x, cy=1/apex radius y, and kx and ky are conic constants relative to the respective x- and y-axes, where $-2.0 < kx < 0.0$ and $-2.0 < ky < 0.0$; and
the peripheral aspheric zone is rotationally symmetrical about the z-axis and defined by the equation:

$$z = \frac{(cx)(x^2)}{1 + \sqrt{1 - (1+kx)(cx^2)(x^2)}}$$

where z and x are coordinates relative to the respective z- and x-axes, cx=1/apex radius x, and kx is the conic constant, where $-2.0 < kx < 0.0$.

20. The lens of claim 18, wherein, for the central zone, $-1.0 < kx < 0.0$ and $-1.0 < ky < 0.0$, and for the peripheral zone, $-1.0 < kx < 0.0$, or wherein, for the central zone, $-0.7 < kx < -0.1$ and $-0.7 < ky < -0.1$, and for the peripheral zone, $-0.7 < kx < -0.1$.

21. The lens of claim 18, wherein, for the central zone, $kx = ky = -0.16$, and wherein, for the peripheral zone, $kx = -0.16$.

22. The lens of claim 18, further comprising a blending zone between the central and peripheral zones, wherein the blending zone forms a smoothened transition between the central zone and the peripheral zone, and the blending zone is described at least in part by spline curves.

23. The lens of claim 22, wherein, along a first cylindrical meridian and a second spherical meridian, the slope changes of the spline curves in the blending zone are opposite of each other, and along a third meridian between the first and second meridians in the blending zone, a continuation of the central zone generally matches a continuation of the peripheral zone.

24. The lens of claim 23, wherein the third meridian is about halfway between the first and second meridians, and along the first and second meridians, the slope changes of the spline curves in the blending zone have about the same magnitude.

* * * * *